United States Patent [19]

Schmitt

[11] 4,214,425
[45] Jul. 29, 1980

[54] CROP HARVESTERS

[75] Inventor: Helwig Schmitt, Grebenstein bei Kassel, Fed. Rep. of Germany

[73] Assignee: Massey-Ferguson Services N.V., Curacao, Netherlands Antilles

[21] Appl. No.: 915,421

[22] Filed: Jun. 14, 1978

[30] Foreign Application Priority Data

Jun. 18, 1977 [DE] Fed. Rep. of Germany ....... 2727549

[51] Int. Cl.² .............................. A01D 75/22; 56 228
[52] U.S. Cl. .................................................. 56/228
[58] Field of Search ................................... 280/415 R

[56] References Cited

U.S. PATENT DOCUMENTS

| | | | |
|---|---|---|---|
| 1,930,855 | 10/1933 | MacGregor | 56/228 |
| 3,683,605 | 8/1972 | Jakobi | 56/228 |
| 3,936,994 | 2/1976 | Mortier et al. | 56/228 |

Primary Examiner—Jay N. Eskovitz
Attorney, Agent, or Firm—Robert L. Farris

[57] ABSTRACT

A harvester having means for reducing its width for transport has a crop gathering table, and a harvester body portion connected to the gathering table by a vertical pivot. The harvester body portion can be swung about the pivot axis from a longitudinal working position to a transverse transport position to reduce the width of the harvester for transport.

8 Claims, 5 Drawing Figures

CROP HARVESTERS

This invention relates to crop harvesters and particularly, but not exclusively, to such harvesters in the form of combined harvesting and threshing machines or combines.

Much work has been done on making provision for reducing the width of combines for transport by road or by rail.

Currently, most large self-propelled combines are provided with detachable crop gathering tables. For road transport, the wide tables are placed on a trailer, detached and trailed behind the self-propelled main body of the combine. Other approaches to the same problem have been to provide means for telescoping the table for transport, and to provide means for folding the outer ends of the table upwards for transport.

In the case of tractor-mounted combines, the transport arrangements of self-propelled combines have not generally been applicable, and this has been one factor limiting the size of tractor-mounted combines.

An object of the invention is to provide an improved arrangement for reducing the width of crop harvesters, such as combines, for transport.

According to the invention there is provided a crop harvester comprising a crop gathering head, and a harvester body operatively connected to the crop gathering head, characterized in that at least part of the harvester body is connected to the crop gathering head by pivot means which permits pivotal movement of at least said part of the harvester body relative to the crop gathering head from a working position to a transport position to reduce the width of the harvester An embodiment of the invention will now be described by way of example with reference to the accompanying drawings in which:

FIG. 5 shows in side elevation an assembly of straw-walkers and part of their drive, forming part of the combine of FIGS. 1 to 4.

Figure 1:
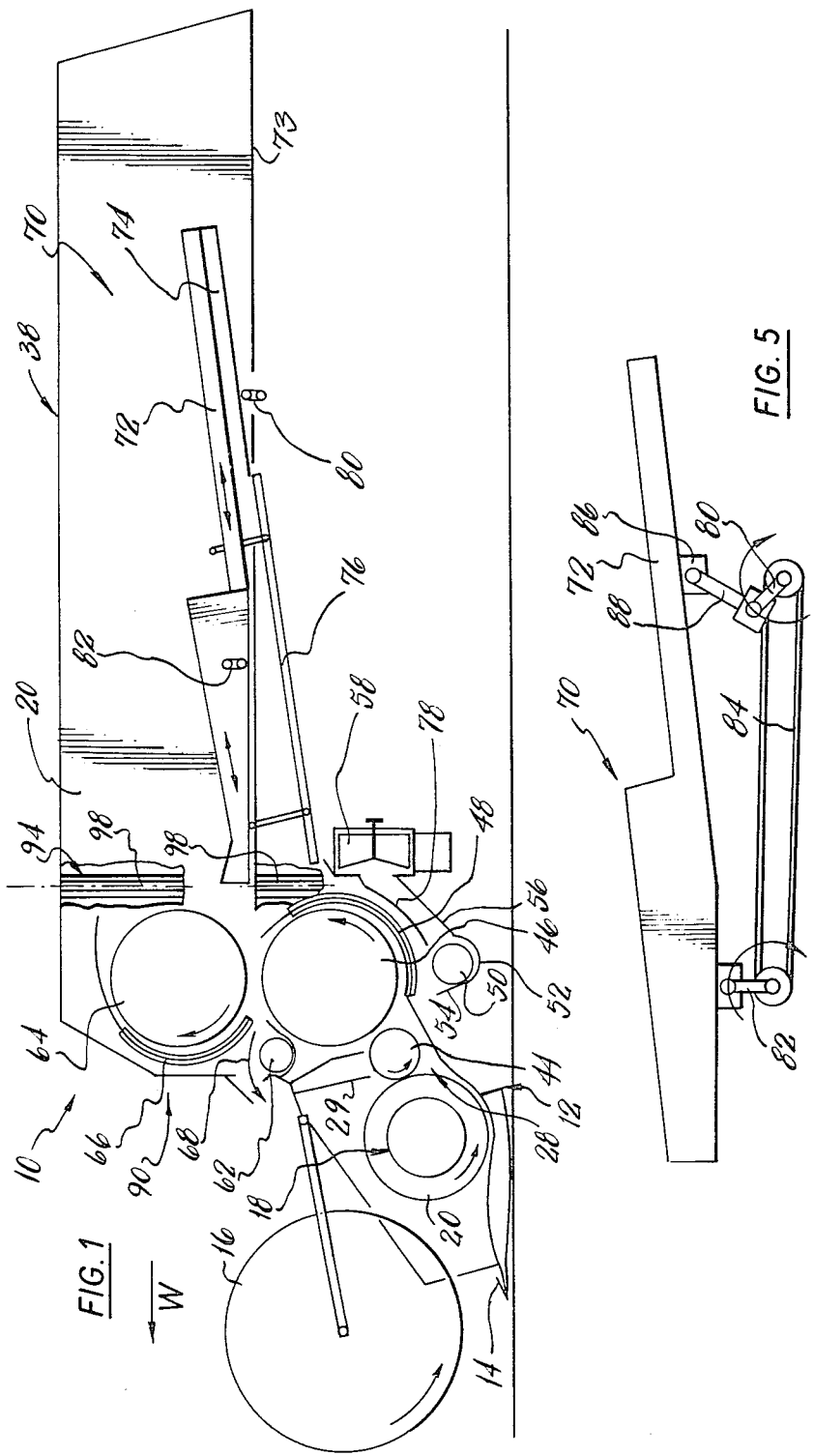
FIG. 1 shows, diagrammatically, a longitudinal sectional view through a tractor-mounted combine in its working condition.

As shown in the drawings, a crop harvester in the form of a tractor-mounted combine 10 comprises a crop gathering head in the form of a table 12 having a cutterbar 14, a reel 16, and an auger 18.

Figure 2:
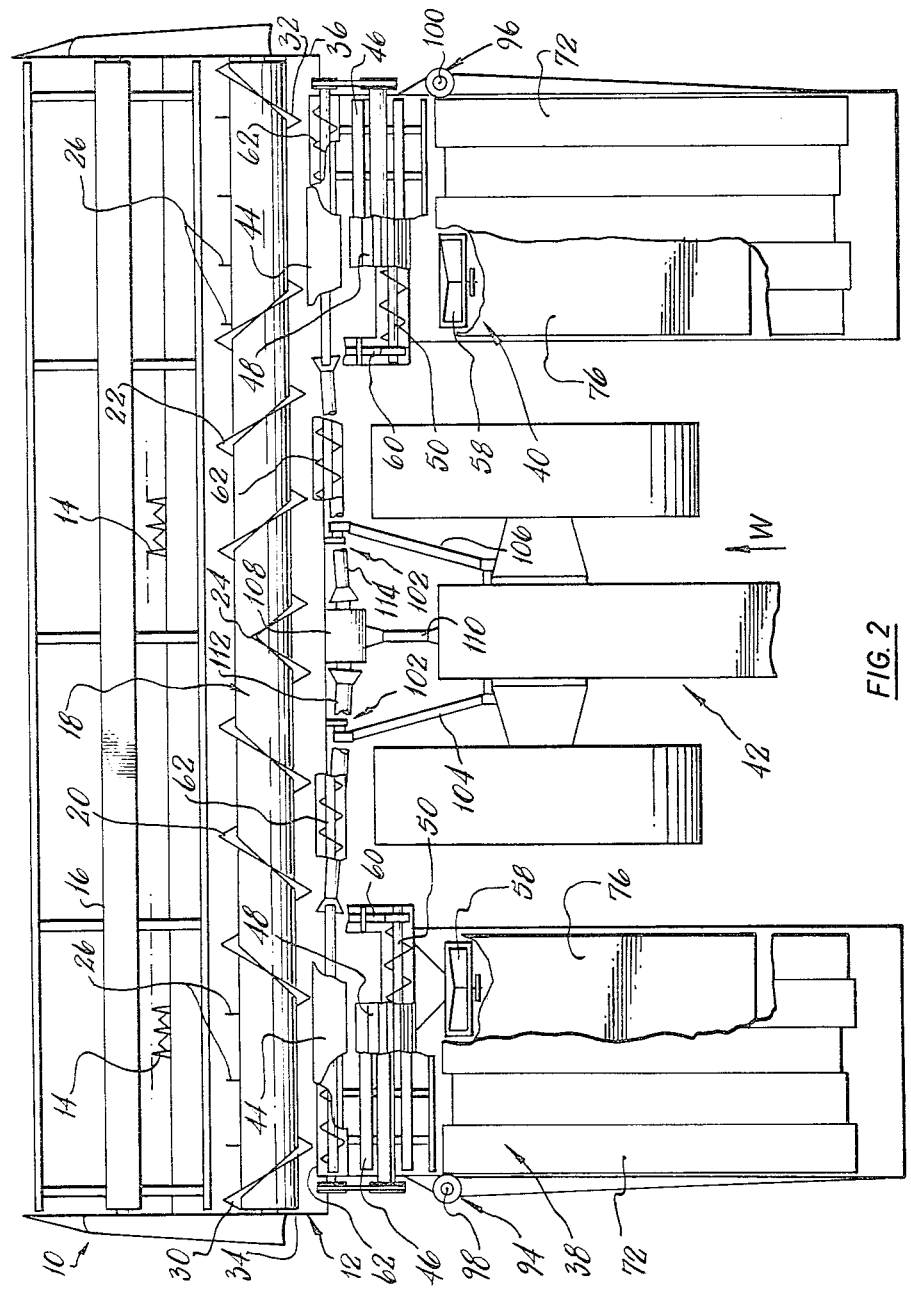
FIG. 2 shows, diagrammatically, a partly-sectional plan view of the combine of FIG. 1 in its working condition, mounted on a tractor.

As shown in FIG. 2, auger 18 has two main helical auger flights 20, 22 each commencing at the mid-point 24 along the length of the auger, which feed crop in opposite directions outwards towards respective sets of crop discharge fingers 26 which are controlled by internal eccentrics (not shown) as the auger rotates, and extend, feather and retract to feed crop rearwards through opening 28 in the rear wall 29 of the table. Two short auger flights 30, 32 at the extreme ends of auger 18 feed crop laterally inwards to fingers 26 from the ends 34, 36 of table 12.

The two streams of crop material fed through openings 28 in the rear of table 12 are received by first and second substantially identical harvester bodies 38, 40 respectively, each operatively connected to the crop gathering head 12 to be driven by a tractor 42, in unison with the gathering head, and to thresh and separate crop material received from the head. Since the harvester bodies 38, 40 are substantially identical, only one (38) need be described.

The crop material from the crop gathering head 12 received by harvester body 38 through opening 28 is fed by a beater 44 to a lower threshing cylinder 46 having an associated concave 48.

An auger 50 in an auger trough 52 having sloping sides 54, 56 is positioned to receive grain from concave 48. Extractor fans 58 are provided to draw air through the grain falling from the concave and to entrain chaff and straw pieces in the air. The thus-precleaned grain is fed by auger 50 to a paddle elevator 60 (FIG. 2) and thence to a second auger 62 which takes the grain to grain cleaning apparatus and a grain tank (not shown).

An upper threshing cylinder 64 and an associated concave 66 are positioned to receive the crop material from between the first threshing cylinder 46 and its concave 48. Cylinder 64 rotates clockwise as seen in FIG. 1 (i.e. in the opposite direction to cylinder 46) and effects further threshing of the crop material. Grain separated through concave 66 is collected by auger 62 and delivered to the grain cleaning apparatus (not shown) with the grain from concave 48.

An air current between upper concave 66 and auger 62 is produced by the rotation of lower threshing cylinder 46. This air current entrains chaff and short straw passing through concave 66 with the grain and thus effects a degree of grain cleaning. The chaff and short straw are discharged in the direction indicated by arrow 68 in FIG. 1.

Grain separating apparatus 70 in the form of straw walkers 72 is positioned at a relatively high level to receive the threshed crop from upper threshing cylinder 64 and is operative to separate the remaining grain from the straw prior to discharge of the straw from the rear of body portion 38 of the combine.

Grain separated by the straw walkers 72 is collected by collecting means in the form of grain pans 74 and 76 mounted on the oscillating walkers, and is fed forwards and discharged onto a guide plate 78 from which it falls towards the trough 52 of auger 50 and is cleaned by the airstream caused by fans 58.

Straw walkers 72 are relatively short. To maximize their capacity, their stroke (or throw) is adjustable, as is the rate of feed of crop to them by threshing cylinder 64.

The straw walkers are mounted on rotatable crankshafts 80, 82 connected by a roller chain 84. Between the rear crankshaft 80 and the rear straw walker bearings 86 is provided pivoted-connecting-means 88 which allows the two crankshafts to be driven non-synchronously and at different speeds. By adjustment of the relative positions of the crankshafts 80 and 82 about their axes of rotation, a longer stroke can be effected by crankshaft 80 and connecting means 88 in combination, than by front crankshaft 82. Furthermore, the height of the stroke of walkers 72 can be adjusted by adjustment of the crankshafts and of connecting means 88.

In order to reduce the width of the combine 10 for transport purposes, provision is made for the portions 90, 92 of the two harvester bodies 38, 40 respectively, housing the upper threshing cylinders 64, their concaves 66 and the straw walkers 72 to be connected to the crop gathering combine table 12 by respective pivot means 94, 96. The pivot means 94, 96 permit pivotal movement of the harvester body portions 90, 92 relative to the combine table about respective upwardly extending axes 98, 100, from their working positions shown in FIGS. 1 and 2 in which the harvester body portions extend in the fore/aft direction, to a transport position shown in FIGS. 3 and 4 in which the harvester body portions lie vertically above auger 18 of the combine table 12 in end-to-end relationship.

The two pivot means 94, 96 are in the form of very substantial hinge assemblies located outside their respective harvester bodies 38, 40 and providing the respective substantially vertical pivot axes 98, 100.

The forward grain pans 76 below straw walkers 72 are mounted so as to be movable upwards to a transport position before pivotal movement of the harvester body portions 90, 92 to their transport positions, so as to avoid fouling lower concave 48 or adjacent parts of the combine.

Quick release locks (not shown) are provided to secure the harvester body portions 90, 92 in their working and transport positions.

As shown in FIG. 2, the combine table 12 has attachment means 102 at its rear side whereby it may be mounted on the three hitch links (draught links 104, 106 and a top link, not shown) of tractor 42, with the two harvester bodies 38, 40 arranged alongside the tractor, one at each side of the tractor. The table 12 also has a drive input gearbox 108 positioned to be driven by the power-take-off (p.t.o.) drive of the tractor by an input shaft 110. The gearbox 108 drives laterally extending drive output shafts 112, 114 connected to all the mechanisms of the combine 10.

During harvesting, crop is cut by cutterbar 14, gathered by reel 16 and table 12, conveyed laterally by auger 18 and discharged by fingers 26 into the two harvester bodies 38, 40. The crop is threshed by cylinder and concave assemblies 46, 48 and 64, 66 and discharged onto the high level straw walkers 72. Grain is separated by concaves 48 and 66 and straw walkers 72 and is cleaned by fans 58 and by the air flow from cylinder 46 before being passed for further cleaning and deposition in the grain tank (not shown).

Figure 3:
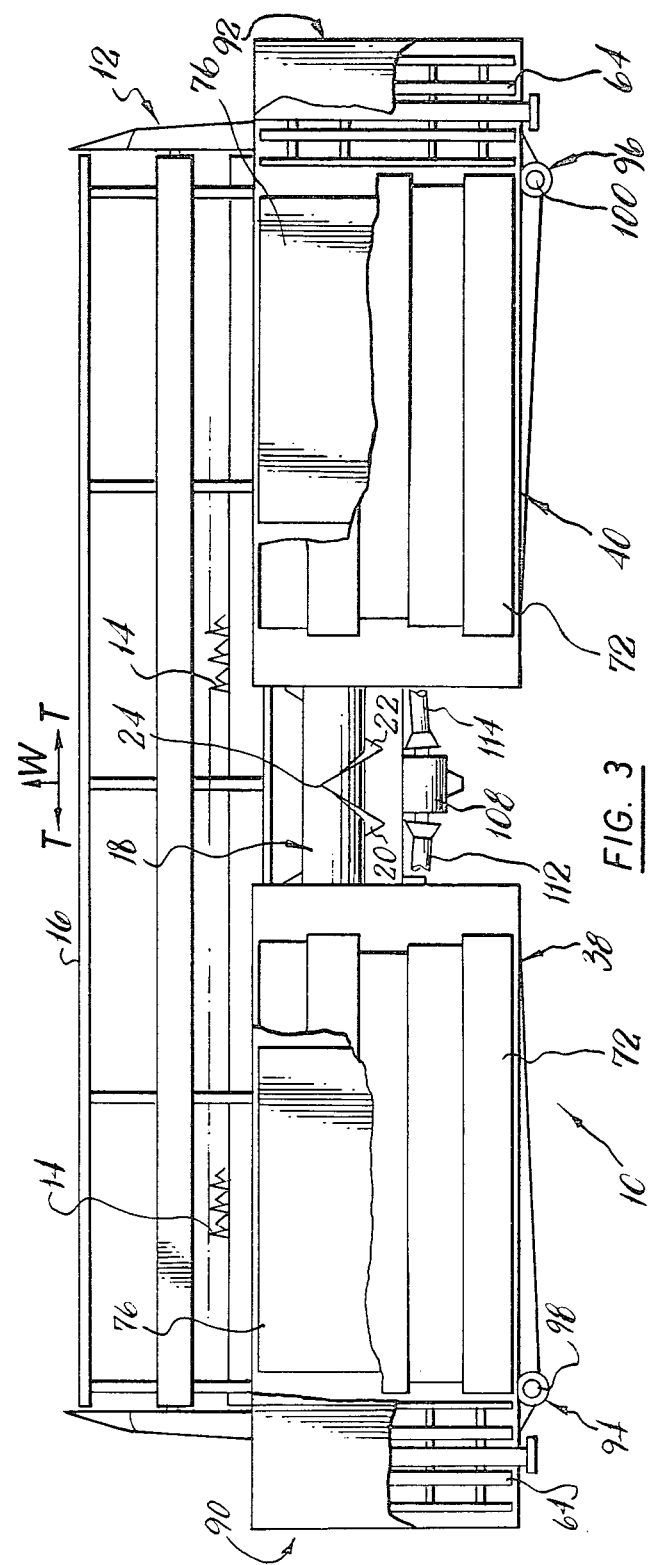
FIG. 3 shows, in a view similar to FIG. 2, the combine in its transport condition, detached from the tractor.
Figure 4:
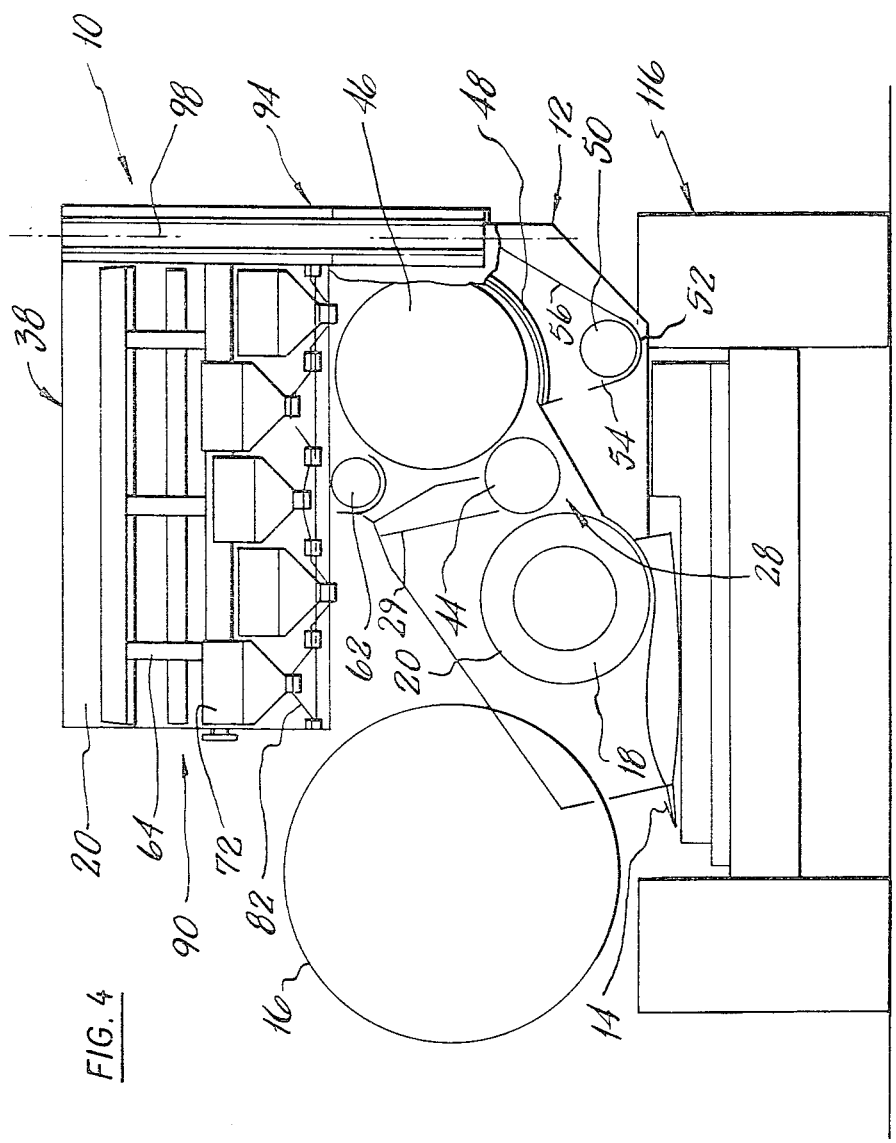
FIG. 4 shows, diagrammatically and sectioned, the combine in its transport condition, as in FIG. 3, mounted on a trailer for road transport.

For transport, the tractor lifts the table 12 and places it on a trailer 116 (FIG. 4), the tractor's hitch links and p.t.o. shaft 110 are then disconnected, and after releasing the locks (not shown), the harvester body portions 90, 92 are swung around to their transport positions shown in FIGS. 3 and 4. Harvester 10 is then transported in direction T i.e. table 12 proceeds endwise, at right angles to its direction W of operative forward motion during harvesting.

The advantages of the embodiment described above lie in the provision of simple means for significantly reducing the width of the combine for transport. The exact location of pivot means 23 is important in this respect. In this way it has been possible to provide a high capacity tractor-mounted combine which is nevertheless easily transported. Furthermore, such provision has been made without resort to the use of unconventional and untested machine components and layouts.

Among modifications which would be made to the above-described embodiment which nevertheless fall within the scope of the invention are the following:

1. the use of other crop gathering heads such as corn heads for harvesting rows of maize or corn;
2. provision could be made for attaching interchangeable crop gathering heads (or tables);
3. it is to be understood that the invention is not limited in application to grain combines but could be applied to any harvesting machine having a wide crop gathering head connected to a relatively narrow body;
4. the invention could also be applied to self-propelled harvesters; and
5. a modified combine layout could be provided having only one harvester body arranged, in the working position, at the right or left hand side of the tractor.

I claim:

1. A crop harvester comprising a crop gathering head, and a harvester body operatively connected to the crop gathering head, characterized in that at least part of the harvester body is connected to the crop gathering head by pivot means which permits pivotal movement of at least said part of the harvester body relative to the crop gathering head from a working position to a transport position to reduce the width of the harvester and wherein the harvester body houses a lower threshing cylinder, an upper threshing cylinder positioned to receive crop from the lower threshing cylinder and grain separating apparatus positioned to receive crop from the upper threshing cylinder, the portion of the harvester body housing the upper threshing cylinder and the grain separating apparatus being connected to the remainder of the harvester body and to the crop gathering head by said pivot means.

2. A harvester according to claim 1 characterized in that said harvester body houses grain separating apparatus comprising straw walkers driven by a pair of rotatable crankshafts, one of the crankshafts having pivoted connecting means connecting the crankshaft to the straw walkers.

3. A harvester according to claim 1 characterized in that said pivot means permits pivotal movement of at least said part of the harvester body to a transport position in which said part lies vertically above at least part of the crop gathering head.

4. A harvester according to claim 3 characterized in that said part of the harvester body comprises collecting means for separated crop material, said collecting means being mounted so as to be movable upwards to a transport position before said pivotal movement of said part of the harvester body.

5. A harvester according to claim 1 characterized in that said pivot means comprises a pivot having an upwardly extending pivot axis, the pivot being located outside the harvester body.

6. A harvester according to claim 1 characterized by attachment means on said crop gathering head, whereby at least part of the harvester may be mounted on the hitch links of a tractor, the attachment means being positioned so that in the working position, said part of the harvester body is located alongside the tractor.

7. A harvester according to claim 6 characterized by a second harvester body operatively connected to the crop gathering head, at least part of the second harvester body being connected to the crop gathering head by second pivot means which permits pivotal movement of at least said part of the second harvester body relative to the crop gathering head from a working position to a transport position, the attachment means being positioned so that in the working position the tractor is positioned between said harvester bodies.

8. A harvester according to claim 7 characterized in that said pivot means provide upwardly extending pivot axes for at least said parts of the harvester bodies, the axes being positioned so that the harvester bodies lie substantially end-to-end in the transport position.

* * * * *